United States Patent

[11] 3,602,045

[72] Inventors Franz Pernau
    Vienna;
    Karl Klerr, Mollersdorf, both of, Austria
[21] Appl. No. 850,000
[22] Filed Aug. 14, 1969
[45] Patented Aug. 31, 1971
[73] Assignee Semperit Osterreichisch Amerikanische
    Gummiwerke Aktiengesellschaft
    Vienna, Austria
[32] Priority Aug. 19, 1968
[33] Austria
[31] A 8066/68

[54] APPARATUS FOR TESTING THE BONDING STRENGTH OF TIRE BEADS
    14 Claims, 3 Drawing Figs.
[52] U.S. Cl. ........................ 73/146, 73/100
[51] Int. Cl. ........................ G01m 17/02, B60c 15/00
[50] Field of Search ........................ 33/203, 203.12; 73/146, 146.2, 100, 150 A

[56] References Cited
UNITED STATES PATENTS
2,595,069  4/1952  Fritz ........................ 73/100 X
FOREIGN PATENTS
1,248,336  8/1967  Germany ........................ 73/146
1,053,641  9/1964  Great Britain ........................ 73/146

Primary Examiner—Louis B. Prince
Assistant Examiner—Daniel M. Yasich
Attorney—Jacobi, Davidson & Kleeman ABSTRACT: There is disclosed an apparatus for testing the bonding strength of tire beads through periodic loading thereof, and, if desired, by rolling the tire contact or running surface on a drum. The apparatus incorporates two rim members for retaining the tire beads. These rim members are arranged upon two shaft members which are independent of one another.

INVENTORS
FRANZ PERNAU
KARL KLERR

3,602,045

APPARATUS FOR TESTING THE BONDING STRENGTH OF TIRE BEADS

BACKGROUND OF THE INVENTION

The present invention relates to an improved apparatus for testing or checking the bonding strength of tire beads through periodic loading.

It is not possible to adequately determine at motor vehicles or at tire-testing machines, by means of general tests, all loads which occur, in order to obtain an impression about the strength of the different tire sections. Oftentimes, it is necessary to intentionally load a predetermined tire area or zone in order to be able to make positive short term observations about the condition of the quality of the tire. In so doing, it is important that the tires are loaded at predetermined sections particularly strongly, so that the desired test results are available in a short period of time.

SUMMARY OF THE INVENTION

Therefore, a real need exists in the art for equipment which enables the checking of the bonding strength of the tire beads in an extremely quick and reliable fashion. It is just this objective which is one of the primary aims of the present invention.

Another, more specific object of the present invention is to provide an improved apparatus for reliably and accurately testing the bonding strength of tire beads.

Still a further noteworthy object of the present invention relates to an improved apparatus for checking tires, and specifically, the bonding strength of tire beads, which apparatus is relatively simple in construction, extremely reliable in operation, relatively inexpensive to manufacture, and can be easily used without any extraordinary skill or complicated operations.

It should be appreciated that the bead zones which are tested with the inventive apparatus are not sufficiently loaded at standard tire-testing equipment. Thus, with such standard testing procedures, it is not possible to make any useful predictions about the duration or longevity of these zones.

One prior art type of testing apparatus contemplates fixedly mounting or attaching the tire beads upon two separated or spaced rims. These rims are aligned with, but not attached to, one another. Additionally, one of the rims is mounted to be displaceable in axial direction. During the rotational movement of the tire, both rims are periodically displaced in axial direction towards one another. It is possible to additionally load the tire in radial direction, for instance, by using a revolving drum.

During this oscillating movement of the rim halves towards one another, both beads are simultaneously deformed throughout the entire periphery. This phenomena does not occur in actual practice, since deformation only occurs at the sole of the wall and, additionally, requires a really massive machine construction. The defects obtained do not correspond to those prevailing in practice.

Now, in order to overcome the aforementioned drawbacks of the prior art constructions, and in order to implement the heretofore-mentioned objects of the invention, the invention contemplates the provision of a new and improved apparatus for checking or testing the bonding strength of tire beads, in which the tire beads are held in two rims arranged upon two independent and nonaligned shaft members. The beads are subjected to various movements which, while not corresponding to the bead movements encountered in practice, nonetheless the defects which occur do correspond to those encountered in practice. The weakest location of pneumatic-tire vehicles, especially truck tires, is the tread zone and the shoulder portions. When running straight without camber or obliquely at the drum-testing machine, normally the defect will occur at such location. This is the reason that bead constructions cannot be positively tested in this manner. With the inventive apparatus, during testing, it is possible to obtain an intentional loading of only the bead zone. Consequently, it is not necessary to have such great deformation forces. Hence, the machine can be constructed to be relatively simple and inexpensive.

BRIEF DESCRIPTION OF THE DRAWINGS

The invention will be better understood and objects other than those set forth above, will become apparent, when consideration is given to the following detailed description thereof. Such description makes reference to the annexed drawings, wherein, throughout the various embodiments the same reference numerals have generally been employed for like or analogous elements, and wherein.

DESCRIPTION OF THE PREFERRED EMBODIMENTS

Figure 1:
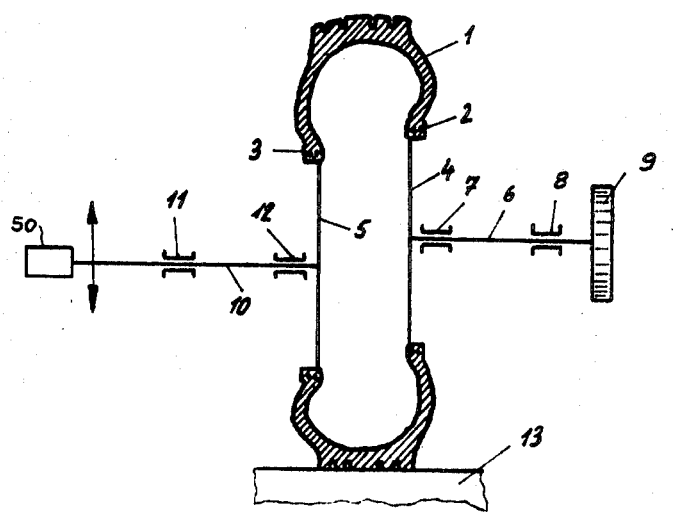
FIG. 1 represents a schematic illustration of a first embodiment of inventive tire-testing machine.

Describing now the drawings, and, in particular, referring to the exemplary illustrated embodiment of tire-testing equipment depicted in FIG. 1, it will be seen that a tire 1 is clamped by means of its beads 2 and 3 at two rims 4 and 5, respectively, these rims being independent of one another. Considering first, rim member 4, it will be seen that such is operably coupled with a shaft 6 mounted in suitable bearings 7 and 8. Shaft 6 can be driven via a gear 9, or any other suitable drive element, constituting part of a conventional drive arrangement, the gear 9 for instance, being operably coupled with a suitable drive unit or motor, which for convenience in illustration has been omitted. The second rim member 5 is secured to a shaft 10, which, in turn, is rotatably mounted in suitable bearings 11 and 12. Continuing, it will be understood that shaft 10 can be displaced in substantial parallelism with respect to the other shaft 6 by means of any appropriate displacing or adjusting mechanism, here schematically shown by reference numeral 50. By virtue of this displacement of both shaft members 6 and 10 relative to one another, the tire 1 is deformed at the region of its bead portions.

Additionally, through the use of suitable mechanism, depicted here for instance as a revolving drum 13, it is possible to further load the tire 1 in radial direction. Driving of the tire to be tested can also occur by virtue of the action of this revolving drum 13. However, it should be clearly understood that without resorting to the use of this drum 13, it is possible to obtain sufficient test results with respect to the loadability of the tire beads.

Figure 2:
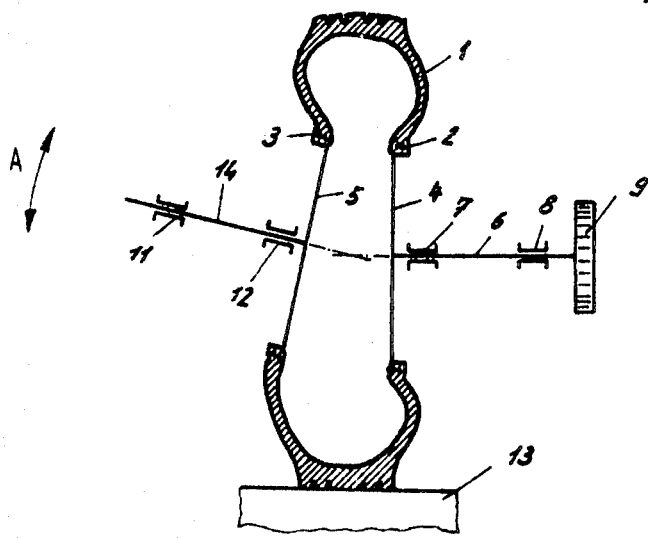
FIG. 2 schematically illustrates a second embodiment of inventive tire-testing machine.

The embodiment of testing apparatus depicted in FIG. 2 generally shows a machine construction similar to that of FIG. 1, with the exception that, in this instance, the second rim member 5 is secured to a shaft 14 mounted to be displaceable, for instance in the direction of the double-headed arrow A, through an angle with respect to the first shaft 6. Whereas with the apparatus structure of FIG. 1, the tire bead is displaced axially to-and-fro, with the equipment depicted in FIG. 2 of loading of the tire bead occurs through its being flexed or bent outwardly and inwardly. Furthermore, these shafts 6 and 14, can be arranged in such a fashion that they intersect one another. Also, in this instance, the drive for the tire can occur via a revolving drum 13, as shown. With this arrangement, the shafts are not driven. It will be understood that with both of the preceding described apparatus constructions, the deformations travel or extend over the entire periphery of the tire.

Turning now to the embodiment of testing equipment depicted in FIG. 3, it will again be observed that one of the beads 2 of the tire 1 is retained in a rim member 4. Rim member 4 is seated upon the shaft 6. The second bead 3 is fixed or clamped in a rim member 15, which, in turn, is rotatably mounted through the agency of a suitable bearing 21, upon an eccentric or eccentric arm 20 of an eccentric shaft 16. Eccentric shaft 16, in turn, is rotatably mounted in bearings 17 and 18, as shown, and opposite to the shaft 6. Here also, this eccentric shaft 16 is driven via a suitable drive gear 19 which coacts with an appropriate nonillustrated drive motor. The revolving movement of the tire 1 is generated by means of the driven revolving drum 13, the shaft member 6 being mounted so as to be freely rotatable. At the same time, the eccentric shaft 16 is driven. Due to the rotational movement of the eccentric shaft 16, the eccentric arm means 20 and, therefore the rim 15, is periodically moved towards the revolving drum 13. Owing to the rotation of the revolving drum 13, the tire is also rotated therewith, since the rims 15, 4 upon which it is supported, can freely rotate in the bearings 21, 7 and 8. In order to prevent slipping of the tire 1 upon the revolving drum 13, during greater eccentricity of the eccentric arm 20, it is possible to additionally also drive the shaft member 6, as indicated by the schematically represented drive mechanism 51.

The speed of rotation of the eccentric shaft 16 is advantageously greater or smaller than the speed of rotation of the shaft 6, whereby, it is possible to always load different tire sections. Furthermore, it should be understood that, similar to the embodiments heretofore described, the eccentric shaft 16 can be, however, arranged so as to be also displaced parallel to the shaft member 6 or pivotably mounted so as to be displaceable through a given angle.

Figure 3:
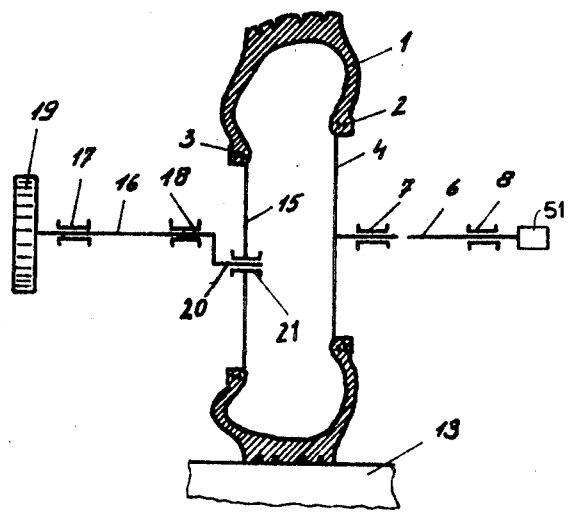
FIG. 3 illustrates a third embodiment of inventive tire-testing machine.

The equipment depicted in FIG. 3 can also operate without the aid of the revolving drum 13. In such case, the shaft member 6 can be rendered stationary and only the eccentric shaft 16 is driven. In this instance, the bead portion of one tire side is continuously loaded in the peripheral direction, without the tire itself rolling off.

On the other hand, if the eccentric shaft 16 is stationary and the tire is driven through the action of the revolving drum 13 and/or if the eccentric shaft 16 is driven, then, it is therefore possible to achieve the same effect as with the apparatus structure of FIG. 1.

It should be apparent from the foregoing detailed description, that the objects set forth to the outset to the specification have been successfully achieved. Accordingly,

What we claim is:

1. Apparatus for testing the bonding strength of tire beads through periodic loading, comprising a pair of rim members for retaining the tire beads, a respective shaft member upon which each rim member is mounted, and means for rotating at least one of said shaft members, said shaft members being independent of one another and being at all times during testing arranged in nonaligned relationship to provide intensified loading and deformation of the tire beads during testing to thus reduce the required testing time.

2. Apparatus as defined in claim 1, wherein one shaft member is disposed parallel with respect to the other shaft member.

3. Apparatus as defined in claim 2, further including means for displacing one shaft member relative to the other shaft member.

4. Apparatus as defined in claim 1, wherein one shaft member is capable of being pivoted through an angle relative to the other shaft member.

5. Apparatus as defined in claim 1, further including means for driving the other shaft member.

6. Apparatus as defined in claim 1, further including a driven revolving drum upon which the tire undergoing testing rolls, said shaft members constituting nondriven elements.

7. Apparatus as defined in claim 1, wherein one of said shaft members is constructed as a rotatably mounted eccentric shaft means, and means for enabling rotation of said rotatably mounted eccentric shaft means in its associated rim member.

8. Apparatus as defined in claim 7, wherein said eccentric shaft means and the other shaft member can be displaced in substantial parallelism relative to one another.

9. Apparatus as defined in claim 7, wherein said eccentric shaft means and the other shaft member can be pivoted through an angle with respect to one another.

10. Apparatus as defined in claim 7, further including means for driving a given one of said shaft members, the other of said shaft members being stationary.

11. Apparatus as defined in claim 7, further including drive means for driving said eccentric shaft means.

12. Apparatus as defined in claim 11, further including drive means for driving the other shaft member.

13. Apparatus as defined in claim 12, wherein said drive means enables driving of said eccentric shaft means at a different rotational speed than said other shaft member.

14. Apparatus as defined in claim 12, wherein said drive means enables driving of said other shaft member at a different rotational speed than said eccentric shaft means.